US012667846B2

(12) United States Patent
Goto et al.

(10) Patent No.: US 12,667,846 B2
(45) Date of Patent: Jun. 30, 2026

(54) MICROFLUIDIC DEVICE AND SAMPLE ANALYSIS METHOD

(71) Applicant: TOPPAN PRINTING CO., LTD., Tokyo (JP)

(72) Inventors: Keisuke Goto, Taito-ku (JP); Yoichi Makino, Taito-ku (JP); Yuta Suzuki, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 862 days.

(21) Appl. No.: 17/464,114

(22) Filed: Sep. 1, 2021

(65) Prior Publication Data

US 2021/0394185 A1 Dec. 23, 2021

Related U.S. Application Data

(63) Continuation of application No. PCT/JP2020/006402, filed on Feb. 19, 2020.

(30) Foreign Application Priority Data

Mar. 1, 2019 (JP) ................................ 2019-037543

(51) Int. Cl.
*B01L 3/00* (2006.01)

(52) U.S. Cl.
CPC . *B01L 3/502761* (2013.01); *B01L 2200/0642* (2013.01); *B01L 2200/0647* (2013.01); *B01L 2200/0689* (2013.01); *B01L 2200/12* (2013.01); *B01L 2300/0864* (2013.01); *B01L 2300/0893* (2013.01); *B01L 2300/161* (2013.01)

(58) Field of Classification Search
CPC ....... B01L 3/502761; B01L 2200/0642; B01L 2200/0647; B01L 2200/0689; B01L 2200/12; B01L 2300/0864; B01L 2300/0893; B01L 2300/161; B01L 7/52; B01L 2200/0673; B01L 2300/0816; B01L 2300/0851; B01L 2300/0861; B01L 2300/0877; B01L 2300/166; B01L 3/5027; G01N 33/54366
USPC .......................................... 422/502, 500, 50
See application file for complete search history.

(56) References Cited

U.S. PATENT DOCUMENTS

| | | | | |
|---|---|---|---|---|
| 2015/0344647 A1* | 12/2015 | Maeda | B32B 27/325 428/141 |
| 2018/0299380 A1 | 10/2018 | Makino et al. | |

FOREIGN PATENT DOCUMENTS

| | | | | |
|---|---|---|---|---|
| EP | 1 975 120 A2 * | 1/2008 | B81C 1/00 |
| JP | 2006-053090 A | 2/2006 | |
| JP | 2007-244319 A | 9/2007 | |
| JP | 2008-246348 A | 10/2008 | |
| JP | 2014-503831 A | 2/2014 | |
| JP | 2014-224710 A | 12/2014 | |
| JP | 6183471 B2 | 8/2017 | |
| WO | WO 2012/121310 A1 | 9/2012 | |
| WO | WO2013/151135 A1 | 12/2015 | |
| WO | WO 2017/115863 A1 | 7/2017 | |
| WO | WO 2017/188401 A1 | 11/2017 | |

OTHER PUBLICATIONS

International Search Report issued Apr. 7, 2020 in PCT/JP2020/006402, filed Feb. 19, 2020, 5 pages (with English Translation).
Kim et al., "Large-scale femtoliter droplet array for digital counting of single biomolecules", Lab Chip, 12, 4986-4991, 2012.
Combined Chinese Office Action and Search Report issued Dec. 26, 2023 in Chinese Application No. 202080015365.5, with English translation, therein, 13 pgs.
Official Communication issued Mar. 11, 2025, in corresponding Japanese Patent Application No. 2024-051418, 3 pages.

* cited by examiner

*Primary Examiner* — Christine T Mui
(74) *Attorney, Agent, or Firm* — Oblon, McClelland, Maier & Neustadt, L.L.P.

(57) ABSTRACT

A microfluidic device including a microwell array having microwells, and a cover member facing the microwell array with a gap between the cover member and the microwell array, and having a flow path formed in the gap. The cover member has a surface facing the microwell array, and the surface has an arithmetic average roughness Ra of 70 nm or less.

9 Claims, 4 Drawing Sheets

MICROFLUIDIC DEVICE AND SAMPLE ANALYSIS METHOD

CROSS-REFERENCE TO RELATED APPLICATIONS

The present application is a continuation of International Application No. PCT/JP2020/006402, filed Feb. 19, 2020, which is based upon and claims the benefits of priority to Japanese Application No. 2019-037543, filed Mar. 1, 2019. The entire contents of all of the above applications are incorporated herein by reference.

BACKGROUND OF THE INVENTION

FIELD OF THE INVENTION

The present invention relates to microfluidic devices and sample analysis methods.

DISCUSSION OF THE BACKGROUND

In recent years, studies have been performed on microwell arrays having various fine flow-path structures formed by etching techniques or photolithography techniques used to manufacture semiconductor circuits, or fine plastic molding. The wells of such microwell arrays are used as chemical reaction vessels for causing various biochemical or chemical reactions in very small volumes of fluid.

Hard substances such as silicon and glass, and soft substances such as polymer resins and silicone rubbers including PDMS (polydimethylsiloxane) are used as materials for manufacturing microfluidic systems. For example, PTLs 1 to 3 and NPL 1 describe utilizing such microfluidic systems as various microchips and biochips.

In recent years, techniques for inspecting biological substances by causing a reaction in a minute space with a very small volume have been drawing attention. Such techniques include digital measurement techniques, for example. One example of a digital measurement technique is a new approach for detection and quantification of nucleic acid called digital PCR (Digital Polymerase Reaction). In digital PCR, a mixture of a reagent and a nucleic acid is divided into innumerable microdroplets, and PCR amplification is performed so that signals such as fluorescence are detected from droplets containing the nucleic acid, and the number of droplets from which the signals have been detected is counted for quantification.

As methods for producing the microdroplets, a method of forming microdroplets by dividing a mixture of a reagent and a nucleic acid using a sealant, or a method of forming microdroplets by disposing a mixture of a reagent and a nucleic acid in pores formed on a substrate and then supplying a sealant are being studied.

PTL 1: JP 6183471 B

PTL 2: JP 2014-503831 T

PTL 3: WO 2013/151135

NPL 1: Kim S. H., et al., Large-scale femtoliter droplet array for digital counting of single biomolecules., Lab on a Chip, 12 (23), 4986-4991, 2012.

SUMMARY OF THE INVENTION

According to an aspect of the present invention, a microfluidic device includes a microwell array having microwells, and a cover member facing the microwell array with a gap between the cover member and the microwell array, and having a flow path formed in the gap. The cover member has a surface facing the microwell array, and the surface has an arithmetic average roughness Ra of 70 nm or less.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
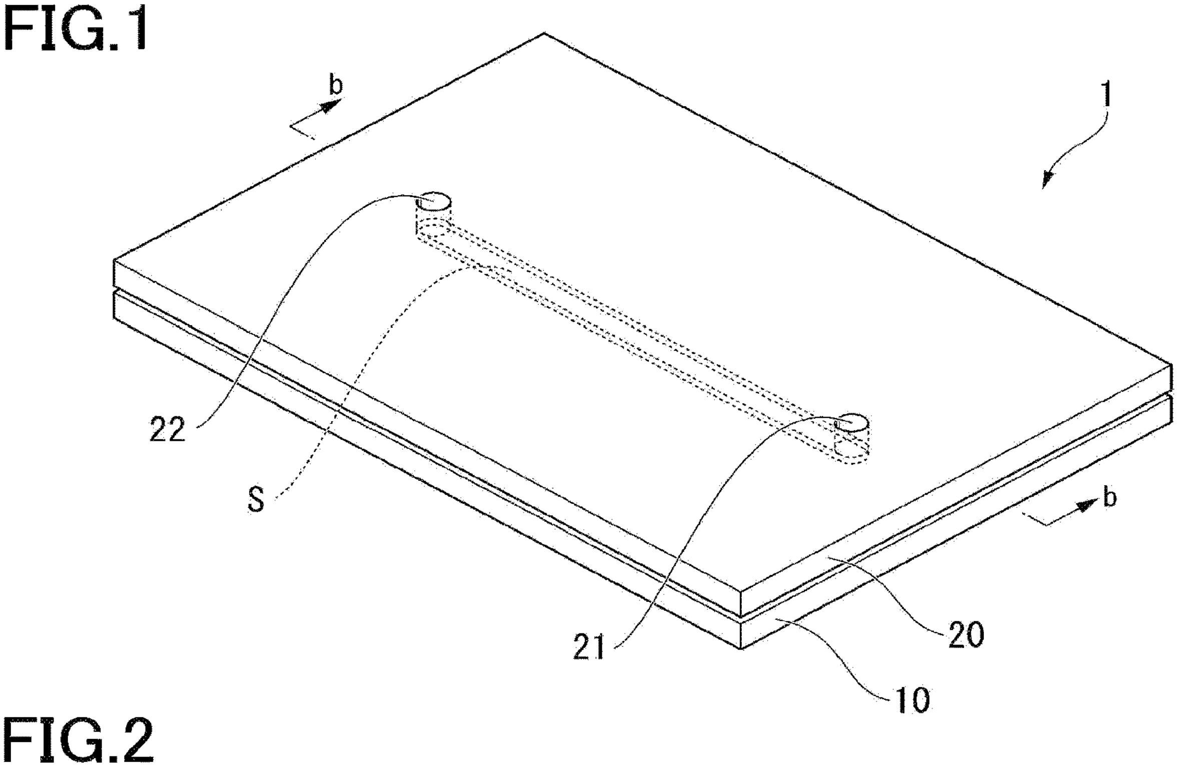
FIG. 1 is a perspective view of a microfluidic device according to an embodiment of the present invention.

The embodiments will now be described with reference to the accompanying drawings, wherein like reference numerals designate corresponding or identical elements throughout the various drawings.

With reference to FIGS. 1 to 5, an embodiment of the present invention will be described below. In the following description, the dimensions in the drawings may be exaggerated for the purpose of illustration, and may not necessarily be to scale.

Figure 2:
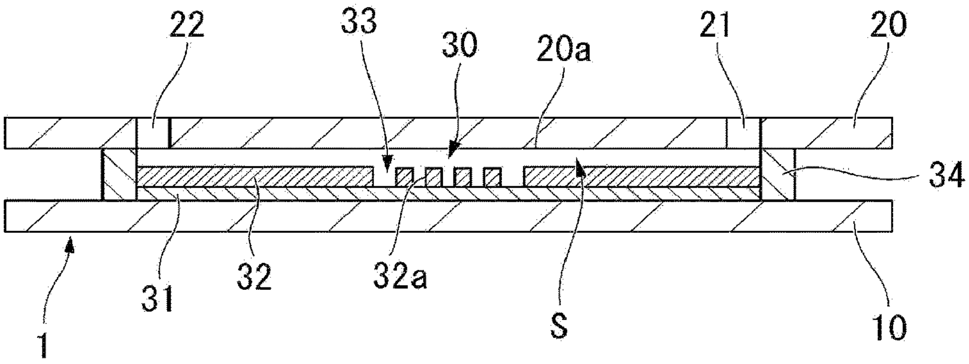
FIG. 2 is a cross-sectional view taken along the line b-b of FIG. 1.

FIG. 1 is a perspective view illustrating a microfluidic device 1 according to the present embodiment. FIG. 2 is a cross-sectional view taken along the line b-b of FIG. 1. As shown in FIGS. 1 and 2, the microfluidic device 1 includes a microwell array 30 having a plurality of wells, and a cover member 20 facing the microwell array 30 with a space therebetween which serves as a flow path 35 between the microwell array 30 and the cover member 20. The microwell array 30 may only include a substrate 10, or include a bottom layer 31 and a wall layer 32 in addition to the substrate 10. A peripheral member 34 is provided between the microwell array 30 and the cover member 20. The area sandwiched between the microwell array 30 and the cover member 20, and surrounded by the peripheral member 34, forms the flow path 35. The peripheral member 34 may be formed integrally with the cover member 20.

The substrate 10 may allow electromagnetic waves to be transmitted therethrough. Examples of electromagnetic waves include X-rays, ultraviolet light, visible light, and infrared light. Since the substrate 10 allows electromagnetic waves to be transmitted therethrough, fluorescence, phosphorescence, or the like generated by reaction between a sample and a reagent enclosed in the microfluidic device 1 can be observed through the substrate 10.

The substrate 10 may only allow electromagnetic waves within a certain wavelength range to be transmitted therethrough. For example, when presence of a sample in a microwell is determined depending on whether fluorescence with a peak in a wavelength range of 350 to 700 nm, which is a visible light region, is detected, a substrate that at least allows visible light in this wavelength range to be transmitted therethrough can be used as the substrate 10.

Materials for forming the substrate 10 include, for example, glass, resin, and the like. Examples of the material of the resin substrate include an ABS resin, polycarbonate resin, COC (cycloolefin copolymer), COP (cycloolefin polymer), acrylic resin, polyvinyl chloride, polystyrene resin, polyethylene resin, polypropylene resin, polyvinyl acetate, PET (polyethylene terephthalate), PEN (polyethylene naphthalate), and the like. These resins may contain various additives. Examples of the additives include an antioxidant, an additive for imparting water repellency, and an additive for imparting hydrophilicity. The resin substrate may include only one or a mixture of the above-mentioned resins.

Since the sample analysis method described below makes use of fluorescence or phosphorescence, a material that substantially does not exhibit autofluorescence is used for the substrate 10. The phrase "substantially does not exhibit autofluorescence" as used herein refers to the fact that the substrate does not exhibit any autofluorescence at any wavelength used for detection of experimental results, or exhibits autofluorescence that is negligible and does not affect the detection of experimental results. For example, autofluorescence which is not more than one-half, more preferably, not more than one-tenth of the fluorescence to be detected can be regarded as being insignificant for the detection of experimental results.

The thickness of the substrate 10 can be determined as appropriate, but to facilitate transmission of the fluorescence or phosphorescence generated during sample analysis, for example, it is preferably 5 millimeter (mm) or less, more preferably 2 mm or less, and still more preferably 1.6 mm or less. In addition, to facilitate processing, it is preferably 0.1 mm or greater, more preferably 0.2 mm or greater. The upper and lower limits of the thickness of the substrate 10 can be combined as appropriate. For example, the thickness of the substrate 10 is preferably 0.1 mm or more and 5 mm or less, more preferably 0.2 mm or more and 2 mm or less, and still more preferably 0.4 mm or more and 1.6 mm or less.

The cover member 20 (may also be simply referred to as a cover 20) may be a plate or sheet-like member. The cover member 20 faces the microwell array 30 with a gap therebetween. In other words, the cover member 20 covers a plurality of microwells 33. The flow path 35 is the area surrounded by the cover member 20, the microwell array 30, and the peripheral member 34. The flow path 35 is connected to the openings of the microwells 33, and is located above the microwells 33.

The cover member 20 includes a first hole 21 and a second hole 22 penetrating in the thickness direction. In plan view of the cover member 20, the first hole 21 and the second hole 22 are positioned so that one or more of the solution holding portions (microwells 33) are located between the two holes.

The first and second holes 21, 22 are connected to the internal space S of a completed microfluidic device 1, which includes the microwell array 30 and the flow path 35. The first and second holes 21, 22 serve as an inlet for providing fluid into the internal space S and an outlet for discharging the fluid, respectively.

Materials for forming the cover member 20 and a thickness of the cover member 20 may be the same as those of the substrate 10.

When the cover member 20 is configured to allow electromagnetic waves to be transmitted therethrough, the electromagnetic-wave transmission properties thereof can be set as appropriate. For example, when the step of irradiation of electromagnetic waves, which is described later, is not performed through the cover member 20, the cover member 20 may not necessarily allow electromagnetic waves to be transmitted therethrough.

The arithmetic mean roughness (Ra) of a surface **20*a* of the cover member 20 facing the microwell array 30 is 70 nm or less, preferably 60 nm or less, more preferably 50 nm or less, even more preferably 40 nm or less, and particularly preferably 35 nm or less. Further, the arithmetic mean roughness (Ra) of the surface 20*a* of the cover member 20 facing the microwell array 30 may be 30 nm or less, 25 nm or less, 20 nm or less, or 15 nm or less. When the arithmetic mean roughness (Ra) of the surface 20*a* of the cover member 20 facing the microwell array 30 is 50 nm or less, non-specific adsorption of the reagent to the surface 20*a* of the cover member 20 facing the microwell array 30** can be suppressed.

The lower limit of the arithmetic mean roughness (Ra) of the surface **20*a* of the cover member 20 facing the microwell array 30** is not particularly limited, but, for example, it may be 5 nm.

The upper and lower limits of the arithmetic mean roughness (Ra) of the surface **20*a* of the cover member 20 facing the microwell array 30 can be combined as appropriate. For example, the arithmetic mean roughness (Ra) of the surface 20*a* of the cover member 20 facing the microwell array 30** may be 5 nm or more and 70 nm or less, 5 nm or more and 60 nm or less, 6 nm or more and 50 nm or less, 7 nm or more and 40 nm or less, 7 nm or more and 35 nm or less, 8 nm or more and 30 nm or less, 8 nm or more and 25 nm or less, 9 nm or more and 20 nm or less, or 10 nm or more and 15 nm or less.

The arithmetic mean roughness (Ra) may be measured according to the measurement method specified in JIS B 0601-2001. The measurement area may by the entire surface of the cover member or a representative area of the cover member. The measurement area of the present embodiment is defined as a straight line with a length of 800 μm to 1.5 mm centered at the center of the cover member 20.

The method of providing the surface **20*a* of the cover member 20 facing the microwell array 30 with an arithmetic mean roughness (Ra) of 50 nm or less is not particularly limited, but, for example, the cover member 20 may be mirror-polished. When the cover member 20 is manufactured by injection molding, the mold of the cover member 20** may be mirror-finished with diamond paste or the like.

The water contact angle of the surface **20*a* of the cover member 20 facing the microwell array 30** may be 70 degrees or more.

Note that, since the water contact angle of the surface **20*a* of the cover member 20 facing the microwell array 30 is 180 degrees or less, the water contact angle of the surface of the cover member 20 facing the microwell array 30** may be, for example, 70 degrees or more and 180 degrees or less.

The water contact angle may be measured according to, for example, the sessile drop method specified in JIS R 3257-1999. The contact angle may be measured by a method according to ASTM D5725-1997 instead of the sessile drop method according to JIS R 3257-1999.

The surface roughness (ten-point mean roughness) (Rz) of the surface 20*a* of the cover member 20 facing the microwell array 30 is preferably 350 nm or less, more preferably 300 nm or less, and particularly preferably 250 nm or less. Further, the surface roughness (ten-point mean roughness) (Rz) of the surface 20*a* of the cover member 20 facing the microwell array 30 may be 200 nm or less, 150 nm or less, 120 nm or less, 110 nm or less, 100 nm or less, or 90 nm or less. When the surface roughness (Rz) of the surface 20*a* of the cover member 20 facing the microwell array 30 is 350 nm or less, non-specific adsorption of the reagent to the surface 20*a* of the cover member 20 facing the microwell array 30 can be further suppressed.

The lower limit of the surface roughness (ten-point mean roughness) (Rz) of the surface 20*a* of the cover member 20 facing the microwell array 30 is not particularly limited, but, for example, it may be 50 nm.

The upper and lower limits of the surface roughness (ten-point mean roughness) (Rz) of the surface 20*a* of the cover member 20 facing the microwell array 30 can be combined as appropriate. For example, the surface roughness (ten-point mean roughness) (Rz) of the surface 20*a* of the cover member 20 facing the microwell array 30 may be 50 nm or more and 350 nm or less, 55 nm or more and 300 nm or less, 60 nm or more and 250 nm or less, 60 nm or more and 200 nm or less, 60 nm or more and 150 nm or less, 65 nm or more and 120 nm or less, 70 nm or more and 110 nm or less, 70 nm or more and 100 nm or less, or 80 nm or more and 90 nm or less.

The surface roughness (Rz) may be measured according to the measurement method specified in JIS B 0601-2001. The measurement area may by the entire surface of the cover member or a representative area of the cover member. The measurement area of the present embodiment is defined as a straight line with a length of 800 μm to 1.5 mm centered at the center of the cover member 20.

The method of providing the surface 20*a* of the cover member 20 facing the microwell array 30 with a surface roughness (Rz) of 350 nm or less is not particularly limited, but, for example, the cover member 20 may be mirror-polished. When the cover member 20 is manufactured by injection molding, the mold of the cover member 20 may be mirror-finished with diamond paste.

Ra/Rz of the surface 20*a* of the cover member 20 facing the microwell array 30 is preferably 0.10 or more. Ra/Rz of the surface 20*a* of the cover member 20 facing the microwell array 30 is preferably 0.24 or less, more preferably 0.23 or less, even more preferably 0.225 or less. Further, Ra/Rz of the surface 20*a* of the cover member 20 facing the microwell array 30 may be 0.16 or less, 0.15 or less, 0.14 or less, or 0.13 or less.

The upper and lower limits of Ra/Rz of the surface 20*a* of the cover member 20 facing the microwell array 30 can be combined as appropriate. For example, Ra/Rz of the surface 20*a* of the cover member 20 facing the microwell array 30 may be 0.10 or more and 0.24 or less, 0.10 or more and 0.23 or less, 0.10 or more and 0.225 or less, 0.10 or more and 0.16 or less, 0.10 or more and 0.15 or less, 0.10 or more and 0.14 or less, or 0.10 or more and 0.13 or less.

When Ra/Rz of the surface 20*a* of the cover member 20 facing the microwell array 30 is 0.10 or more and 0.24 or less, even when the material of the cover member 20 is hydrophilic, non-specific adsorption of the reagent to the surface 20*a* of the cover member 20 facing the microwell array 30 can be further suppressed. It can be considered that not only the electrical and chemical interactive relationship between the surface 20*a* of the cover member 20 facing the microwell array 30 and the reagent, but also designing the minute unevenness of the surface 20*a* of the cover member 20 facing the microwell array 30 to be small allows the physical interaction to be reduced. When Ra/Rz is less than 0.10, this means that there are protruding portions on the surface 20*a* of the cover member 20 facing the microwell array 30, and it is predicted that non-specific adsorption of the reagent is likely to occur at those portions. When Ra/Rz is greater than 0.24, this means that the surface 20*a* of the cover member 20 facing the microwell array 30 is rough overall, and it is predicted that non-specific adsorption of the reagent is likely to occur.

For the microfluidic device of the present embodiment, applying a hydrophobic coating to the surface 20*a* of the cover member 20 facing the microwell array 30 may be used instead of selecting the arithmetic mean roughness (Ra) to be within the above range. Accordingly, since a hydrophobic coating is applied to the surface 20*a* of the cover member 20 facing the microwell array 30, non-specific adsorption of the reagent to the surface 20*a* of the cover member 20 facing the microwell array 30 can be suppressed.

As an example of the method of applying a hydrophobic coating to the surface 20*a* of the cover member 20 facing the microwell array 30, a hydrophobic coating agent may be applied to the surface 20*a* of the cover member 20 facing the microwell array 30 and then dried.

Examples of the coating agent include fluorine-based coating agents, fluorine-containing polymers, and silicone resins. Examples of the coating method include dry coating and wet coating.

The thickness of the coating layer formed by applying a hydrophobic coating agent to the surface 20*a* of the cover member 20 facing the microwell array 30 is preferably 0.01 μm or more and 3 μm or less, and more preferably 0.05 μm or more and 1 μm or less.

The microwell array 30 may include a bottom layer 31, a wall layer 32 (may also be referred to as a partition wall 32), and a plurality of microwells 33. The bottom layer 31 is formed on the substrate 10. The wall layer 32 is formed on the bottom layer 31. The bottom layer 31, and a plurality of through holes 32*a* formed in the wall layer 32 in the thickness direction form the microwells 33. The microwells 33 are arranged in an array in the wall layer 32. In the internal space S between the substrate 10 and the cover member 20, a gap exists between the microwell array 30 and the cover member 20, in other words, between the upper surface of the wall layer 32 and the cover member 20. This gap serves as a flow path that communicates the plurality of microwells 33 with the first hole 21 and the second hole 22.

The bottom layer 31 forms the bottoms of the microwells 33. Therefore, when it is desired to impart hydrophilicity to the bottoms, the bottom layer 31 may be formed of a hydrophilic material. It is preferable that the bottom layer 31 is formed so that it allows electromagnetic waves to be transmitted therethrough and does not interfere with observation of the samples inside the microwells 33 through the substrate 10. When it is desired to impart hydrophobicity to the bottoms, the bottom layer 31 may be formed of a hydrophobic material. It is preferable that the bottom layer 31 does not interfere with observation of the samples inside the microwells 33 through the substrate 10. It is also preferable to use a material that practically does not exhibit autofluorescence for the bottom layer 31.

If it is allowed that the bottoms of the microwells 33 and the substrate 10 have the same properties, the wall layer 32 may be formed directly on the substrate 10 without providing the bottom layer 31. In that case, the surface of the substrate 10 and the through holes 32*a* in the wall layer 32 form the microwells 33.

The wall layer 32 has a plurality of through holes 32*a* provided in an array as viewed in the thickness direction. The inner surfaces of the respective through holes 32*a* constitute the inner wall surfaces of the respective microwells 33.

Note that the wall layer 32 and the substrate 10 may be formed integrally. In that case, surfaces of the substrate 10 form the microwells 33.

As the material for forming the wall layer 32, a resin or the like similar to the material of the substrate 10 can be used, but it is also possible to use a resin mixed with a colored component that absorbs electromagnetic waves of a predetermined wavelength.

Taking into consideration the properties required for the microwells 33, either a hydrophilic resin in which the constituent molecules contain a hydrophilic group or a hydrophobic resin in which the constituent molecules contain a hydrophobic group can be used as the resin material.

Examples of the hydrophilic group include a hydroxyl group, carboxyl group, sulfone group, sulfonyl group, amino group, amide group, ether group, ester group, and the like. For example, the hydrophilic resin may be selected as appropriate from siloxane polymer; epoxy resin; polyethylene resin; polyester resin; polyurethane resin; polyacrylic amide resin; polyvinyl pyrrolidone resin; acrylic resin such as polyacrylic acid copolymer; polyvinyl alcohol resins such as cationized polyvinyl alcohol, silanolated polyvinyl alcohol, and sulfonated polyvinyl alcohol; polyvinyl acetal resin; polyvinyl butyral resin; polyethylene polyamide resin; polyamide polyamine resin; cellulose derivatives such as hydroxy methyl cellulose and methyl cellulose; polyalkylene oxide derivatives such as polyethylene oxide and polyethylene oxide-polypropylene oxide copolymer; maleic anhydride copolymer; ethylene-vinyl acetate copolymer; styrene-butadiene copolymer; and combinations thereof and the like.

For example, the hydrophobic resin may be selected as appropriate from novolac resin; acrylic resin; methacrylic resin; styrene resin; vinyl chloride resin; vinylidene chloride resin; polyolefin resin; polyamide resin; polyimide resin; polyacetal resin; polycarbonate resin; polyphenylene sulfide resin; polysulfone resin; fluororesin; silicone resin; urea resin; melamine resin; guanamine resin; phenolic resin; cellulose resin; and combinations thereof and the like, but also the selected material needs to have a contact angle of 70 degrees or more when measured by the sessile drop method specified in JIS R 3257-1999. That is, hydrophobicity as used herein means that the contact angle measured according to the sessile drop method specified in JIS R 3257-1999 is 70 degrees or more. The contact angle may be measured by a method according to ASTM D5725-1997 instead of the sessile drop method specified in JIS R 3257-1999.

Both the hydrophilic resin and the hydrophobic resin may be either a thermoplastic resin or a thermosetting resin. Moreover, resins curable with ionizing radiation such as an electron beam or UV light, or elastomers may also be used.

When a photoresist is used as the resin material, a plurality of fine through holes 32*a* can be formed in the wall layer 32 with high precision by photolithography.

When photolithography is used, a known means can be selected as appropriate for the selection of the kind of photoresist, application, and exposure, as well as removal of excess photoresist.

When a photoresist is not used, the wall layer 32 can be formed, for example, by injection molding or the like.

As the colored component, organic or inorganic pigments may be listed as examples. In particular, examples of black pigments include carbon black, acetylene black, and iron black. Examples of yellow pigments include chrome yellow, zinc yellow, ocher, Hansa yellow, permanent yellow, and benzine yellow. Examples of orange pigments include orange lake, molybdenum orange, and benzine orange. Examples of red pigments include red ochre, cadmium red, antimony vermilion, permanent red, lithol red, lake red, brilliant scarlet, and thioindigo red. Examples of blue pigments include ultramarine blue, cobalt blue, phthalocyanine blue, ferrocyanide blue, and indigo. Examples of green pigments include chrome green, viridian naphthol green, and phthalocyanine green.

When the wall layer 32 is formed by injection molding or the like, not only pigments dispersed in the resin but also various dyes dissolved in the resin can be used as colored components. Examples of dyes can be listed according to the mechanism of dyeing. Specifically, a direct dye, basic dye, cationic dye, acidic dye, mordant dye, acidic mordant dye, sulfur dye, vat dye, naphthol dye, disperse dye, reaction dye, or the like can be used. In particular, a disperse dye is often used for dyeing of resin.

The term microwell as used herein refers to a well having a volume of 10 nanoliters (nL) or lower. Microwells 33 of around this volume are suitable for carrying out an enzymatic reaction such as PCR or ICA (Invasive Cleavage Assay) reaction performed in a microspace. For example, digital PCR can be used to detect gene mutation.

The volume of the microwells 33 is not particularly limited, but is preferably 10 femtoliters (fL) or higher and 100 picoliters (pL) or lower, more preferably 10 fL or higher and 5 pL or lower, and most preferably 10 fL or higher and 2 pL or lower. Such volume ranges are suitable for disposing one to several biomolecules or carriers in a single microwell 33 when performing the sample analysis described later.

The shape of the microwells 33 is not particularly limited as long as the volume is within the above range. Accordingly, for example, the shape of the microwells may be a cylindrical shape, a polygonal shape defined by a plurality of faces (e.g., rectangular parallelepiped, or six- or eight-sided prism), an inverted cone shape, an inverse pyramidal shape (inverse three-, four- five- or six-sided pyramidal shape, or inverse seven or more-sided polygonal pyramidal shape), or the like.

Also, the microwells 33 may have a shape, for example, that is a combination of two or more of the shapes mentioned above. For example, some of the microwells 33 may have a cylindrical shape and the others may have an inverted cone shape. When the plurality of microwells 33 have an inverted cone shape or an inverted pyramid shape, the bottom of the cone or pyramid serves as an opening communicating between the flow path 35 and the microwell 33. In this case, the microwells 33 may have a shape obtained by truncating a part of the inverted cone or the inverted pyramid including the apex so that the microwells have flat bottoms. As other examples, the bottoms of the microwells 33 may have a curved shape protruding toward the opening, or the bottoms of the microwells 33 may be curved such that they are recessed.

The thickness of the wall layer 32 defines the depth of the microwells 33. When the microwells are cylindrical, for the purpose of enclosing an aqueous solution (sample) containing biomolecules, the thickness of the wall layer 32 may be, for example, 10 nm or more and 100 μm or less, preferably 100 nm or more and 50 μm or less, more preferably 1 μm or more and 30 μm or less, more preferably 2 μm or more and 15 μm or less, and more preferably 3 μm or more and 10 μm or less.

Considering factors such as the amount of the aqueous solution to be accommodated, and the size of the carriers, such as beads, to which the biomolecules adhere, the dimensions of the microwells 33 can be appropriately determined so that one or several biomolecules are accommodated in one microwell.

The number and density of the microwells 33 in the microwell array 30 can be set as appropriate.

The number of microwells 33 per 1 $cm^2$ is, for example, 10,000 or more and 10 million or less, preferably 100,000 or more and 5 million or less, and more preferably 100,000 or more and 1 million or less. The number of microwells 33 per 1 $cm^2$ may be herein referred to as the density of microwells. When the density of microwells is in this range, the operation of providing the aqueous solution as a sample into a predetermined number of microwells may be facilitated. Further, when the density of microwells is in this range, observation of the wells for analyzing the experimental results may also be facilitated. For example, in the case of detecting mutations of cell-free DNA, if the ratio of the mutated DNA to be detected to wild-type DNA is about 0.01%, it is preferred, for example, to use around 1 to 2 million microwells.

FIG. 1 shows an example where the array is a one-dimensional array in which the microwells 33 are arranged in a row. However, when a large number of microwells are provided as described above, the microwells may be arranged in a two-dimensional array.

A peripheral member 34 that appears as a frame in plan view is disposed around the microwell array. The dimension of the peripheral member 34 in the thickness direction of the microfluidic device 1 is larger than that of the wall layer 32. The peripheral member 34, which supports the cover member 20, forms a gap between the cover member 20 and the microwell array to provide the flow path 35. That is, the area sandwiched between the microwell array 30 and the cover member 20, and surrounded by the peripheral member 34, forms the flow path 35.

The material or the like for the peripheral member 34 is not particularly limited, but an example thereof includes a double-sided adhesive tape formed by a core film made of silicone rubber or an acrylic foam and acrylic adhesives applied on both surfaces of the core film.

Note that the peripheral member 34 may be formed integrally with the cover member 20. In such case, the peripheral member 34 is a step of the cover member 20 and forms a gap between the cover member 20 and the microwell array to provide the flow path 35.

The microfluidic device 1 configured as described above can be produced, for example, by the following procedures.

First, the substrate 10 is prepared, and a resin layer for the wall, which later forms the wall layer 32, is formed on the surface of the substrate 10. In the case where the bottom layer 31 is provided, the bottom layer 31 is formed before forming the resin layer for the wall. Even when the bottom layer 31 is not provided, an anchor layer or the like that enhances adhesion between the substrate 10 and the resin layer for the wall may be provided on the surface of the substrate 10 as needed.

The resin layer for the wall may be formed of a resin material mixed with a colored component. When the resin material is a resist, the content of the colored component with respect to the total mass of the resin material and the colored component may be, for example, 0.5 mass % or higher and 60 mass % or lower. The content is preferably 5 mass % or higher and 55 mass % or lower, and further preferably 20 mass % or higher and 50 mass % or lower. The content of the colored component with respect to the total mass of the resin material and the colored component can be set as appropriate so that the desired pattern can be obtained considering the ratio of the photosensitive component and/or the like contained in the resist. When the colored component is a pigment, the particle size of the pigment is chosen and prepared so that the above-mentioned conditions are met with regard to the microwells to be formed. A dispersant may be added as appropriate to the resin material together with the pigment.

When the material of the formed resin layer for the wall is a mixture of a resin material with a colored component, the resin layer for the wall has a color based on the colored component contained in the resin layer for the wall.

Next, through holes 32*a* are formed in the formed resin layer for the wall. As described above, the through holes 32*a* can be formed easily and accurately when photolithography is used. In the case where the resin layer for the wall is formed by injection molding or the like, the resin layer for the wall and the through holes can be formed in the same process. Other than the above methods, the through holes 32*a* may be formed by, for example, etching using a pattern mask.

Once the through holes 32*a* are formed, the resin layer for the wall becomes the wall layer 32, and the microwell array 30 is completed.

After that, the peripheral member 34 is placed around the microwell array 30 and the cover member 20 is placed on the peripheral member 34. The cover member 20 is placed so that Ra of the surface 20*a* of the cover member 20 facing the microwell array 30 is 50 nm or less. Next, the substrate 10, the peripheral member 34, and the cover member 20 are joined together, and thus the microfluidic device 1 is completed. The flow path is formed between the cover member 20 and the substrate 10 by the peripheral member 34. The joining method is not particularly limited, but, for example, the parts may be joined using an adhesive agent, double-sided tape, or laser welding.

Figure 3:
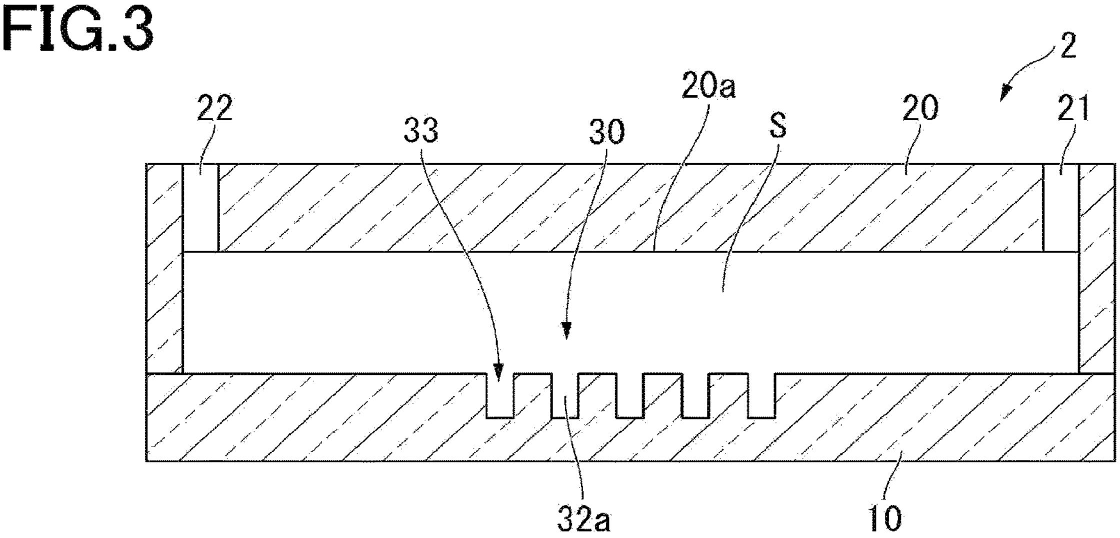
FIG. 3 is a cross-sectional view of a microfluidic device according to an embodiment of the present invention.

It is also possible that the substrate 10 and the wall layer 32 of the microfluidic device 1 may be formed integrally, or the peripheral member 34 and the cover member 20 may be formed integrally. FIG. 3 shows a microfluidic device 2 in which the substrate 10 and the wall layer 32 are integrally formed, and the peripheral member 34 and the cover member 20 are integrally formed. The microfluidic device 2 may be manufactured by placing the substrate 10 formed integrally with the wall layer 32 on the cover member 20 formed integrally with the peripheral member 34, and joining the step, which is formed by integrally forming the peripheral member 34 and the cover member 20, to the substrate 10 integrally formed with the wall layer 32. The step formed on the cover member 20 defines the flow path 35 between the cover member 20 and the substrate 10.

The configuration of the microfluidic device 2 is the same as the above-described microfluidic device 1 except that the substrate 10 and the wall layer 32 are integrally formed, and the peripheral member 34 and the cover member 20 are integrally formed.

As another mode of the microfluidic device, the substrate 10 and the wall layer 32 may be separate components whereas the peripheral member 34 and the cover member 20 are formed integrally. As with the above case, the configuration of this microfluidic device is the same as the above-described microfluidic device 1 except that the peripheral member 34 and the cover member 20 are integrally formed.

Figure 4:
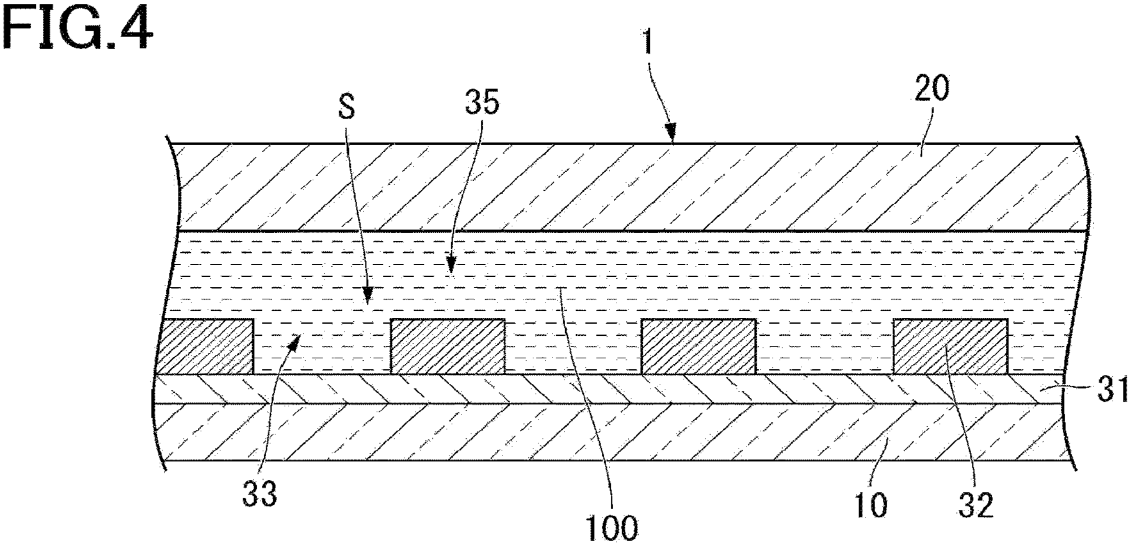
FIG. 4 illustrates a microfluidic device in use according to an embodiment of the present invention.
Figure 5:
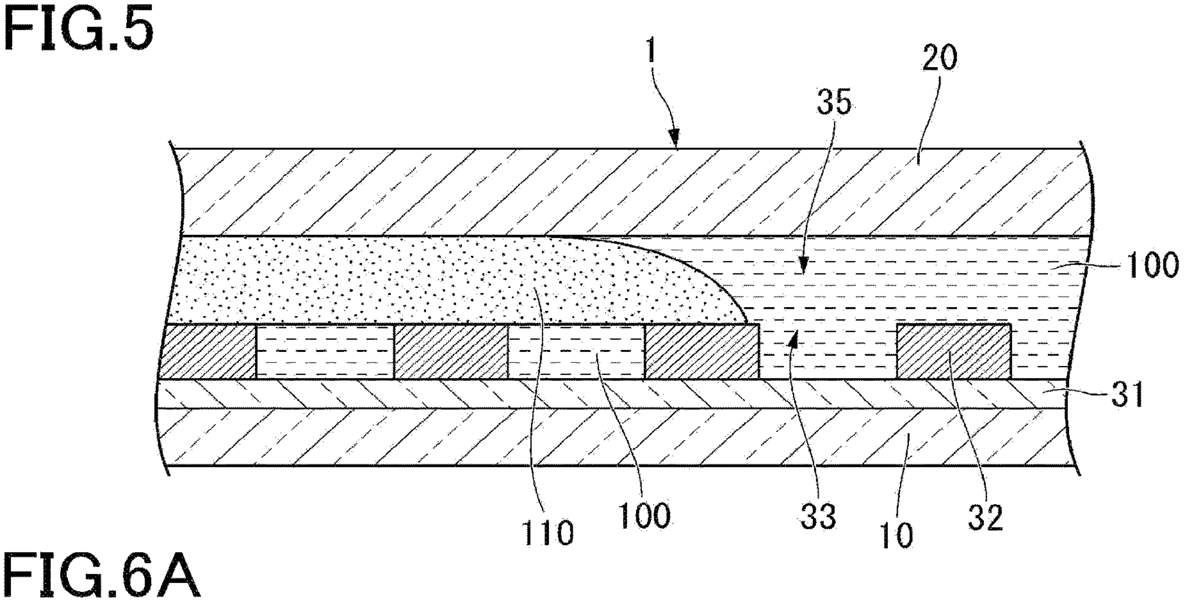
FIG. 5 illustrates a microfluidic device in use according to an embodiment of the present invention.

Next, the sample analysis method of the present embodiment using the microfluidic device 1 according to the present embodiment will be described with reference to FIGS. 4 and 5.

The sample analysis method of the present embodiment is a sample analysis method using the microfluidic device 1 according to the present embodiment, comprising:

- supplying an aqueous solution containing a sample to the flow path 35;
- introducing a sealant into the flow path 35 to replace the aqueous solution in the flow path 35 and encapsulate the aqueous solution in the microwells 33;
- heating the microfluidic device to cause reaction in the microwells 33 and generate signals for detection; and
- detecting the signals.

The aqueous solution as used herein may include, in addition to a sample, water, buffer solution, a detection reaction reagent, and other components as necessary. The aqueous solution may contain an enzyme. For example, when the sample is a nucleic acid, methods such as PCR, ICA, LAMP (registered trademark, Loop-Mediated Isothermal Amplification), the TaqMan method (registered trademark), and the fluorescent probe method may be used. For example, when the sample is a protein, ELISA (registered trademark) may be used. Moreover, the aqueous solution may contain additives such as surfactant.

Examples of buffer solutions include, for example, Tris-HCl buffers, acetate buffers, and phosphate buffers.

Examples of enzymes include, for example, DNA polymerase, RNA polymerase, reverse transcriptase, and flap endonuclease.

Examples of surfactants include TWEEN 20® (also referred to as polyoxyethylene sorbitan monolaurate), TRITON X100® (also referred to as polyethylene glycol mono-4-octylphenyl ether (n=about 10)), glycerol, octylphenol ethoxylate, and alkyl glycosides.

The microfluidic device of this embodiment can appropriately retain the aqueous solution in the well even when, for example, the temperature of the enclosed aqueous solution is changed for detection of gene mutation or the like. The range of temperature change, that is, the range between the lower and upper limits of temperature change may be, for example, 0° C. to 100° C., preferably 0° C. to 80° C., and more preferably 20° C. to 70° C. When the temperature of the aqueous solution enclosed in the wells is within this range, it is possible to appropriately perform reactions such as PCR and ICA reactions in minute spaces.

Examples of samples analyzed using the microfluidic device 1 according to the present embodiment include DNA, RNA, miRNA, mRNA, protein, lipid, cells, and bacterium. The sample may be, for example, a sample collected from a living body such as blood. The detection target to be detected by sample analysis may also be, for example, a PCR product produced using DNA contained in the sample as a template, or an artificially synthesized compound (for example, a nucleic acid artificially synthesized so as to imitate a DNA sample). For example, if DNA which is a biomolecule is the target to be detected, each well may have a shape and size suitable for one molecule of DNA.

Now the sample analysis method will be described below in detail. As a preparative step, an aqueous solution containing the sample to be enclosed in the microwells is prepared. The sample-containing aqueous solution is a solution that contains water as a main solvent in which a target to be detected is contained. For example, the sample-containing aqueous solution may be a PCR reaction solution that contains SYBR Green as a detection reagent and uses a biological sample as a template, an ICA reaction solution that contains an allele probe, ICA oligo, FEN-1, a fluorescent substrate, or the like, or other solutions. A surfactant may be added during the preparation in order to facilitate entry of the sample into the microwells. It is also possible to add beads that specifically recognize the detection target to capture the detection target. The detection target may be suspended in the aqueous solution without being directly or indirectly bound to carriers such as beads.

Next, using a syringe or the like, the prepared aqueous solution 100 containing the sample is supplied to the flow path 35 through the first hole 21 (also referred to as a sample supplying step). As shown in FIG. 4, the supplied aqueous solution 100 containing the sample fills the microwells 33 and the flow path 35. Any gas in the flow path 35 is discharged in advance using a gas discharge operation before the sample supplying step. This gas discharge operation may be carried out by filling the flow path 35 with a buffer. Examples of buffers include water, water containing a buffer solution, water containing a surfactant, and water containing a buffer solution and a surfactant.

Next, an encapsulating step is carried out to encapsulate the aqueous solution containing the sample 100 in the microwells 33. The detection target in the sample contained in the aqueous solution may be labeled with a fluorescent label or the like before the encapsulating step. The fluorescent labeling treatment may be performed before the sample supplying step, for example, during sample preparation, or after the sample supplying step by introducing the fluorescent label into the flow path 35.

In the encapsulating step, the sealant 110 is supplied into the flow path 35 through the first hole 21 using a syringe or the like. The supplied sealant 110 flows through the flow path, and as shown in FIG. 5, pushes the aqueous solution 100 containing the sample in the flow path 35 toward the second hole 22. The sealant 110 replaces the aqueous solution 100 in the flow path 35, and thus the flow path 35 will be filled with the sealant 110. As a result, the sample-containing aqueous solution 100 is distributed into each microwell 33 so that the distributed portions are in an independent state from each other, and the encapsulation of the sample is completed.

A sealant 110 as used herein refers to a liquid used to isolate the portions of aqueous solution introduced into the microwells 33 of the microwell array 30 so that they do not mix with each other. The sealant may be an oil, for example. Examples of oils that may be used include an oil manufactured by Sigma Corporation under the trade name of FC40, an oil manufactured by 3M Company under the trade name of HFE-7500, a mineral oil used for PCR reaction, and the like.

The sealant 110 preferably has a contact angle to the material of the wall layer 32 in the range of 5 to 30 degrees inclusive. When the contact angle of the sealant 110 is within this range, the sealant 110 can push the aqueous solution 100 more easily, and the aqueous solution 100 is less likely to remain on the surface of the cover member 20. As a result, the sample can be appropriately encapsulated in the microwells 33. The contact angle of the sealant may be measured by using a sealant instead of water, for example, in accordance with the sessile drop method stipulated in JIS R3257-1999. The contact angle may be measured by a method according to ASTM D5725-1997 instead of the sessile drop method specified in JIS R 3257-1999.

After that, a reaction step of heating the microfluidic device 1 to cause reaction in the microwells 33 and generate signals for detection is performed.

Examples of signals for detection include fluorescence, chemiluminescence, color development, changes in potential, and changes in pH, but fluorescence is preferable.

Prior to the reaction step, the microfluidic device 1 may be placed in a thermal cycler to cause enzymatic reaction such as PCR reaction or ICA reaction as necessary.

The reaction may be, for example, biochemical reaction, and more specifically, enzymatic reaction. The heating temperature may be determined as appropriate according to the specific reaction, but, for example, it may be 60° C. or higher and 100° C. or lower. The heating temperature does not refer to the actual temperature of the reagent solution in the microwells 33, but the heating temperature of the microfluidic device set by a thermal cycler, an incubator, or the like. Further, the heating temperature of, for example, 60° C. or higher and 100° C. or lower means that the maximum temperature reaches 60° C. or higher and 100° C. or lower, and the temperature does not have to be constantly 60° C. or higher and 100° C. or lower. In other words, the temperature of the microfluidic device 1 may change within the range of temperature change described above. An example of the reaction is a signal amplification reaction. A signal amplification reaction is an isothermal reaction in which, while a reagent solution containing an enzyme for signal amplification is accommodated in the microwells 33, the microfluid device 1 is maintained in a constant temperature condition under which a desired enzyme activity is obtained, for example, 60° C. or higher and 100° C. or lower, for a predetermined period of time, for example, at least 10 minutes, and preferably approximately 15 minutes.

Next, signals produced from the microwells 33 by the reaction are detected (detection step). For example, when the signal is fluorescence, the microfluidic device 1 is set in a fluorescence microscope and irradiated with excitation light (electromagnetic waves). The wavelength of the excitation light is set as appropriate in accordance with the fluorescent label used.

Irradiation of electromagnetic waves may be performed through the substrate 10 of the microfluidic device 1 or through the cover member 20 (i.e., downwards towards the microwells 33), or from any other direction. Further, detection of fluorescence or phosphorescence generated as a result of irradiation with the electromagnetic waves can be performed through the substrate of the microwell array, or through the wells, or in any other direction. For example, detection of fluorescence or phosphorescence with use of a fluorescence microscope can be conveniently performed through the substrate 10 of the microfluidic device 1.

Next, among the microwells 33 that constitute the microwell array 30, the number of microwells 33 that emit fluorescence or phosphorescence is counted. A fluorescent image of the microwell array 30 may be captured and used for the counting.

For example, after causing a PCR reaction in the microwell array 30, the fluorescence of SYBR Green in the microwells 33 in which PCR amplification has been confirmed can be detected to calculate the proportion of the number of microwells 33 in which amplification has been confirmed to the total number of microwells 33. When the detection target is, for example, SNP (Single Nucleotide Polymorphism), the SNP expression frequency or the like can be analyzed by counting the number of fluorescent microwells 33.

In this measuring step, the aqueous solution may contain a protein or an enzyme as a sample, or may contain an enzyme as a reagent. When these proteins or enzymes are not adsorbed on beads and are suspended in the aqueous solution, they are particularly likely to be adsorbed on the surface of the cover member 20. When proteins or enzymes are non-specifically adsorbed on the cover member 20 and these proteins or enzymes emit fluorescence or phosphorescence, this fluorescence or phosphorescence is detected as noise. According to the microfluidic device of the present invention, since this adsorption of proteins or enzymes contained in the sample or reagent to the cover member 20 is reduced, generation of such noise can be suppressed.

Another aspect of the present invention encompasses the following mode.

[8] A microfluidic device comprising a microwell array having a plurality of microwells; and a cover member facing the microwell array with a gap therebetween, wherein a flow path is provided between the microwell array and the cover member, and an arithmetic average roughness Ra of a surface of the cover member facing the microwell array is 5 nm or more and 50 nm or less, and a ten-point average roughness (Rz) thereof is 50 nm or more and 250 nm or less.

[9] The microfluidic device according to [8], further comprising a peripheral member provided between the microwell array and the cover member so as to surround the flow path.

[10] The microfluidic device according to [9], wherein the peripheral member is a step integrally formed with the cover member.

[11] The microfluidic device according to any one of [8] to [10], wherein the surface of the cover member facing the microwell array has a water contact angle of 70 degrees or more, the water contact angle being defined as a contact angle of the surface to a water droplet on the surface.

[12] The microfluidic device according to any one of [8] to [11], wherein an arithmetic average roughness Ra/a ten-point average roughness Rz of the surface of the cover member facing the microwell array is 0.10 or more and 0.23 or less.

[13] The microfluidic device according to any one of [8] to [12], wherein a hydrophobic coating is applied to the surface of the cover member facing the microwell array.

[14] The microfluidic device according to any one of [8] to [13], wherein the hydrophobic coating is one of a fluorine-based coating agent, a fluorine-containing polymer, and a silicone resin.

[15] A sample analysis method using the microfluidic device according to any one of [8] to [14], comprising: supplying an aqueous solution containing a sample to the flow path; introducing a sealant into the flow path to replace the aqueous solution in the flow path and encapsulate the aqueous solution in the microwells; causing a reaction in the microwells to generate a signal for detection; and detecting the signal.

[16] The sample analysis method according to [15], wherein the sample is DNA, RNA, protein, lipid, a cell, or a bacterium.

EXAMPLES

The present invention will be described in more detail referring to the examples described below, but the present invention is not limited to the examples.

Example 1

Two resin members were prepared: a rectangular substrate made of COP (ZEONOR1010R, manufactured by Zeon Corporation) formed by injection molding, and a rectangular cover member made of COP. The COP substrate was formed by injection molding, with cylindrical micropores having a diameter of 10 μm and a depth of 15 μm distributed over the entire surface of the substrate. The cover member was provided with a step (i.e., a peripheral member) having a height of 100 μm, an injection port, and a discharge port. The injection port and the discharge port were positioned inside the peripheral member and along the longitudinal direction of the cover member.

The surface of a steel mold for the cover member corresponding to the bottom surface of the cover member (the surface on which the step is formed) was polished with #3000 diamond paste to mirror-finish the mold.

The water contact angle of the bottom surface of the molded cover member was measured using a contact angle measuring device SA-20 (manufactured by Kyowa Interface Science Co., Ltd.) according to the sessile drop method specified in JIS R 3257-1999. The water contact angle of the bottom surface of the cover member of Example 1 was 85 degrees.

In addition, the surface roughness of the molded cover member was measured using a contact-type surface roughness measuring device (TALYSURF PGI 1240, manufactured by Taylor Hobson). In this measurement, height differences with respect to the starting point (at which the height is assumed as 0 nm) were measured along a scanning section of 800 μm.

Table 1 shows the measurement results of Ra and Rz of the bottom surface of the cover member.

TABLE 1

| | Ra(nm) | Rz(nm) | Ra/Rz |
|---|---|---|---|
| Example 1 | 22 | 99 | 0.222 |
| Comparative Example 1 | 73 | 294 | 0.248 |

The COP substrate and the COP cover member were bonded together by applying a mineral oil to the step on the cover member so that the mirror-processed surface of the cover member faced the substrate, thereby obtaining the microfluidic device.

200 μL of a buffer having the composition shown in Table 2 below was supplied to the flow path between the substrate and the cover member to fill each well of the micropore chip with the buffer.

TABLE 2

| Buffer composition | Final concentration |
|---|---|
| $MgCl_2$ | 20 mM |
| Tris (pH8.5) | 50 mM |
| Tween20 | 0.05% |

Next, 10 μL of a fluorescent reagent (Fluorescein, manufactured by Tokyo Chemical Industry Co., Ltd.) having the composition shown in Table 3 below was supplied to the flow path to replace the buffer with the fluorescent reagent. Further, 150 μl of a fluorocarbon oil (FC40, manufactured by Sigma) was supplied to individually seal the wells of the micropore chip. Although a fluorescence reaction was not carried out in this example, an enzyme was added to the fluorescent reagent in order to create the same conditions as when a fluorescence reaction is carried out.

TABLE 3

| Composition of fluorescent reagent | Final concentration |
|---|---|
| Fluorescent reagent | 2 μm |
| $MgCl_2$ | 20 mM |
| Tris (pH8.5) | 50 mM |
| Flap endonuclease 1 | 0.1 mg/ml |
| Tween20 | 0.05% |

The microfluidic device was placed on a hot plate and heated at 66° C. for 15 minutes. Then, a fluorescent image of the micropore chip was observed with a fluorescence microscope (BZ-710, manufactured by KEYENCE) using a 4× objective lens. The exposure time was 20 msec in bright field and 3000 msec using a fluorescent filter of GFP (Green Fluorescent Protein).

Figure 6A:
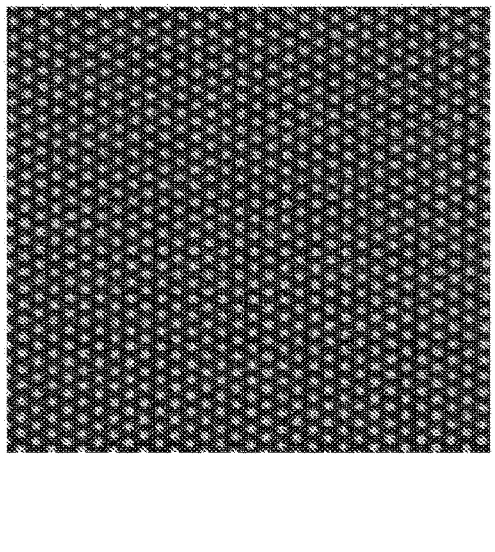
FIG. 6A illustrates a fluorescent image obtained using a microfluidic device according to an embodiment of the present invention.

FIG. 6A shows the result of fluorescence observation of the micropore chip after droplet formation in the microfluidic device of Example 1. The size of the observed image was 580 μm×580 μm. The microfluidic device of Example 1 made it possible to accurately count the number of droplets without the reagent being non-specifically adsorbed on the bottom surface of the cover member.

Comparative Example 1

A microfluidic device was prepared in the same manner as in Example 1 except that the surface of the mold corresponding to the bottom surface of the cover member was not mirror-finished. Table 1 shows the measurement results of Ra and Rz of the bottom surface of the cover member. The water contact angle of the bottom surface of the cover member of Comparative Example 1 was 85 degrees.

Similarly to Example 1, a buffer and a fluorescent reagent were supplied into the microfluidic device to form droplets, and a fluorescent image of the micropore chip was observed.

Figure 6B:
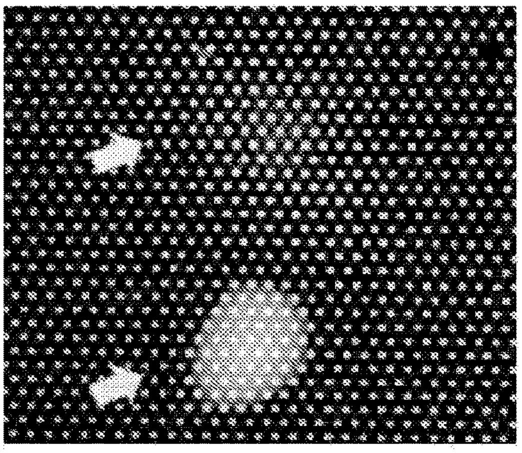
FIG. 6B illustrates a fluorescent image obtained using a microfluidic device according to Comparative Example 1.

FIG. 6B shows the result of fluorescence observation of the micropore chip after droplet formation in the microfluidic device of Comparative Example 1. The arrows in the figure indicate areas where typical reagent adsorption has been seen. Reagent adsorption was seen in many other parts of the image over the entire field of view in addition to those indicated by the arrows.

As shown in FIG. 6B, with the microfluidic device of Comparative Example 1 having a cover member that was not mirror-finished, the reagent nonspecifically adhered to the bottom surface of the cover member, and the correct number of droplets could not be counted due to the areas where reagent adherence occurred.

From this result, it has been revealed that even when the water contact angle of the bottom surface of the cover member is the same, non-specific adsorption of the reagent on the bottom surface of the cover member can be reduced by having Ra of 50 nm or less.

Example 2

Figure 7:
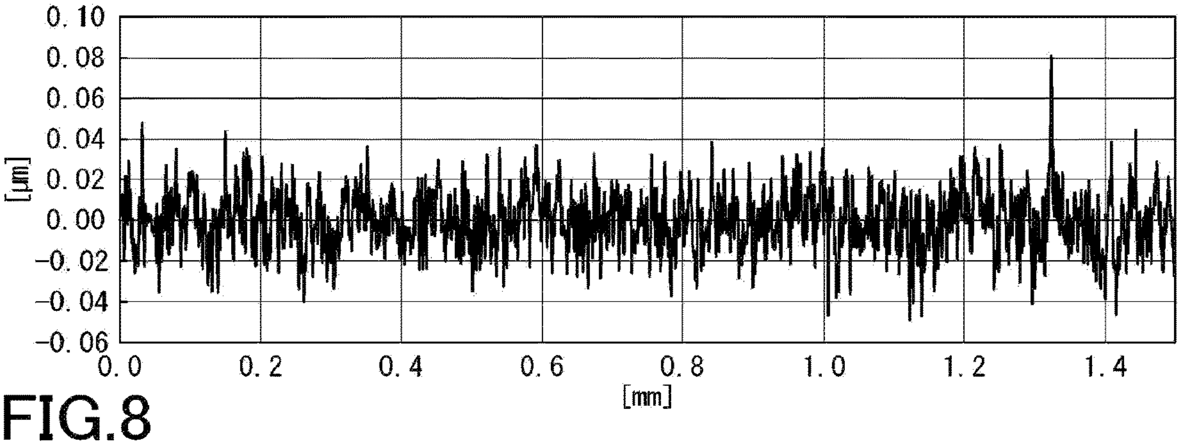
FIG. 7 is a diagram showing the measurement data of surface roughness of a cover member of a microfluidic device according to an embodiment of the present invention.

A COP substrate was prepared in the same manner as in Example 1. A COP cover member was prepared in the same manner as in Example 1 except that the duration of the mirror-finishing of the surface of the mold for the cover member corresponding to the bottom surface of the cover member was extended. The surface roughness of the molded cover member was measured using a surface roughness measuring device (SJ-210, manufactured by Mitutoyo Corporation). A section with a length of 1.5 mm with its center at the center of the cover member and extending in the direction perpendicular to the longitudinal direction of the cover member was scanned to obtain height differences with respect to the starting point (at which the height is assumed as 0 nm). Table 4 shows the measurement results of Ra and Rz of the bottom surface of the cover member of Example 2. FIG. 7 is a diagram showing the measurement data of the surface roughness of the cover member of the microfluidic device of Example 2.

TABLE 4

| | Ra(nm) | Rz(nm) | Ra/Rz | Adsorption area (%) | Evaluation |
|---|---|---|---|---|---|
| Example 2 | 11 | 87 | 0.126 | 1.8 | Good |
| Example 3 | 32 | 237 | 0.135 | 3.6 | Good |
| Comparative Example 2 | 71 | 378 | 0.187 | 22.3 | Poor |
| Comparative Example 3 | 138 | 837 | 0.164 | 21.0 | Poor |

The substrate and the cover member were bonded together by applying a mineral oil to the step on the cover member so that the mirror-processed surface of the cover member faced the substrate, thereby obtaining the microfluidic device.

Under the same conditions as in Example 1, a buffer, a fluorescent reagent, and a mineral oil were supplied into the microfluidic device, and the fluorescent reagent was individually enclosed in the wells of the micropore chip. Note that, although no fluorescence reaction was carried out in this example as with Example 1, an enzyme was added to the fluorescent reagent in order to create the same conditions as when a fluorescence reaction is carried out.

The microfluidic device was placed on a hot plate and heated at 66° C. for 15 minutes. Then, a fluorescent image of the micropore chip was observed with a fluorescence microscope (BZ-710, manufactured by KEYENCE) using a 4× objective lens. The exposure time was 20 msec in bright field and 3000 msec using a fluorescent filter of GFP (Green Fluorescent Protein). A region of 3.6 mm×2.7 mm was observed.

In the fluorescent image, setting the intensity of fluorescence emitted by an enzymatic reaction when a target molecule is present in the well as the reference intensity, regions that emit fluorescence at intensities greater than or equal to the reference intensity were determined as regions on which the fluorescence reagent was adsorbed, and the area of these regions on which the fluorescent reagent is adsorbed was calculated.

The proportion of the area of the regions on which the fluorescent reagent was adsorbed to the total area of the fluorescent image was obtained as the proportion (%) of the adsorption area. When the proportion of the adsorption area was less than 10%, the performance of adsorption reduction was rated "Good", and when it was 10% or higher, the performance of adsorption reduction was rated "Poor". Table 4 shows the results.

Example 3

Figure 8:
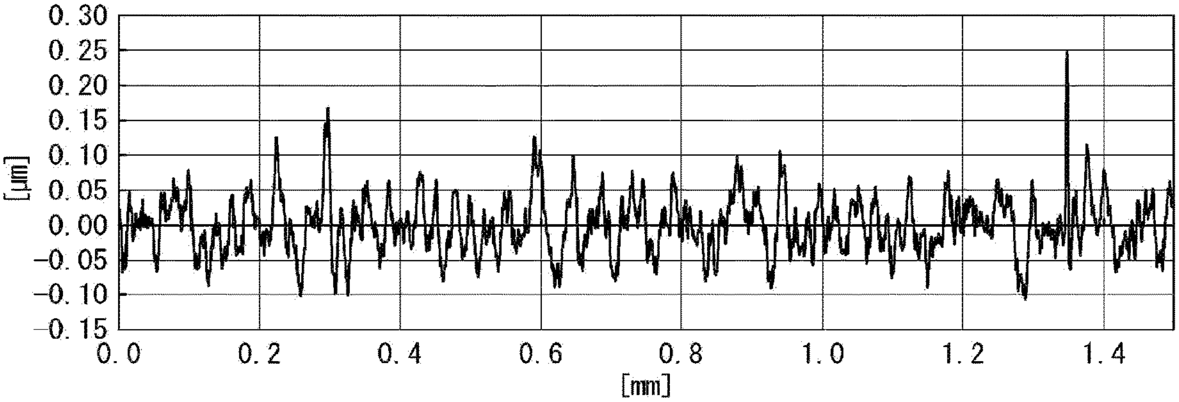
FIG. 8 is a diagram showing the measurement data of surface roughness of a cover member of a microfluidic device according to an embodiment of the present invention.

The adsorption area of the reagent of Example 3 was determined in the same manner as in Example 2 except that the duration of the mirror-finishing of the surface of the mold for the cover member corresponding to the bottom surface of the cover member was reduced. Table 4 shows the results. FIG. 8 is a diagram showing the measurement data of the surface roughness of the cover member of the microfluidic device of Example 3.

Comparative Examples 2 and 3

Figure 9:
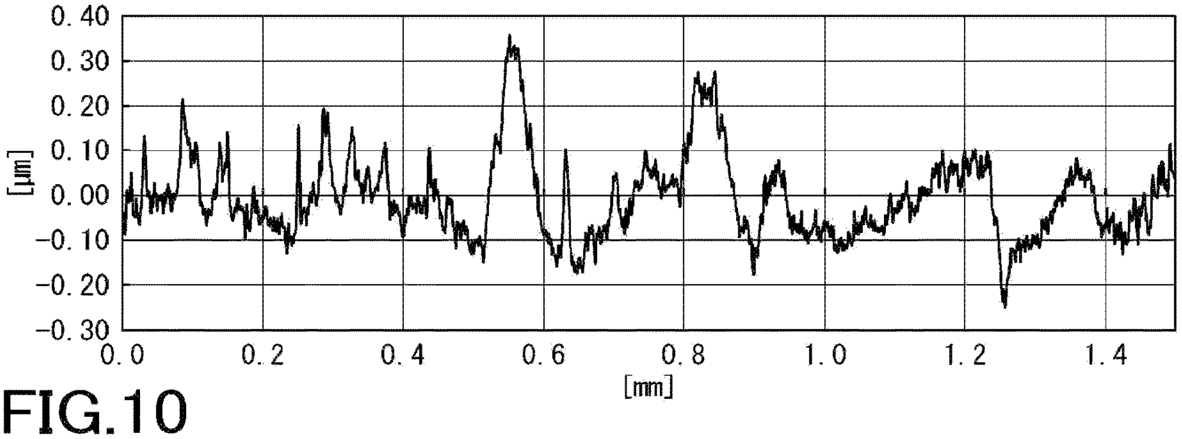
FIG. 9 is a diagram showing the measurement data of surface roughness of a cover member of a microfluidic device according to Comparative Example 2.
Figure 10:
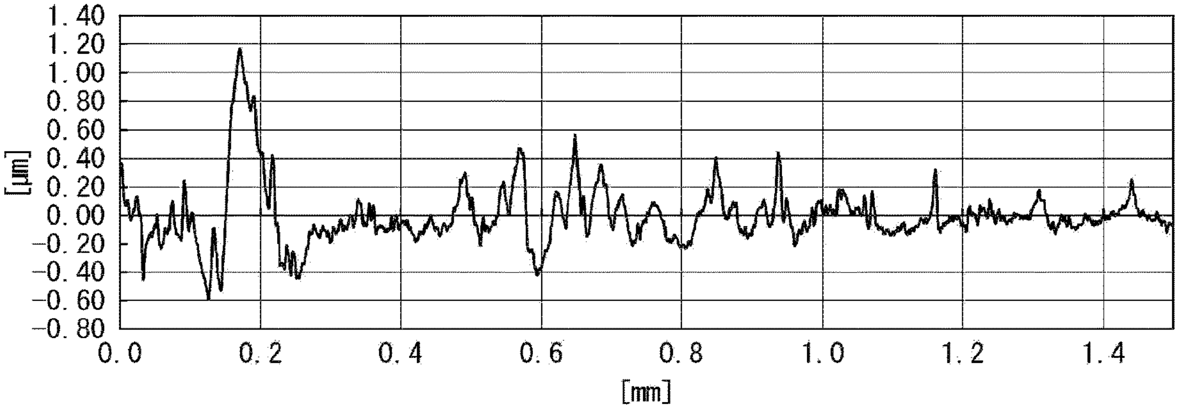
FIG. 10 is a diagram showing the measurement data of surface roughness of a cover member of a microfluidic device according to Comparative Example 3.

The adsorption areas of the reagents of Comparative Examples 2 and 3 were determined in the same manner as in Example 2 except that mirror-finishing of the surface of the mold for the cover member corresponding to the bottom surface of the cover member was not carried out. Table 4 shows the results. FIGS. 9 and 10 are diagrams showing the measurement data of the surface roughness of the cover members of the microfluidic devices of Comparative Examples 2 and 3, respectively.

The proportions of the adsorption areas of Examples 2 and 3, in which Ra of the bottom surface of the cover member, that is, the surface of the cover member facing the microwell array is 70 nm or less, were 1.8% and 3.6%, respectively, which are rated as good.

On the other hand, the proportions of the adsorption areas of Comparative Examples 2 and 3, in which Ra of the surface of the cover member facing the microwell array is greater than 70 nm, were 22.3% and 21.0%, respectively. Since the surface of the mold for the cover member corresponding to the bottom surface of the cover member was not mirror-finished in Comparative Examples 2 and 3, the surface roughness of the bottom surfaces of the cover members could not be controlled, which caused variation in the values of surface roughness.

The reason for rating the performance of adsorption reduction "Good" when the proportion of the adsorption area was less than 10% is as follows.

If the adsorption area proportion is higher than 10%, for example, when one intends to measure a sample of such a low concentration that only one target molecule would be contained in each well of the microfluidic device, the probability of a target molecule being enclosed in a well that overlaps with a region on which the reagent is adsorbed is equal to or higher than 10%. Even if the wells in the regions on which the reagent is adsorbed emit light by enzymatic reactions, the emitted light cannot be detected, and the sample will be erroneously determined as negative (false negative). Even if the same measurement is performed twice, there is a 1% or higher probability (1 in 100 people or more) of false negatives.

On the other hand, when the proportion of the adsorption area is lower than 10%, for example, when the proportion of the adsorption area is 5% or lower as in Examples 2 and 3, the probability of false negatives is 5% or lower. By performing the same measurement twice, the probability of false negatives can be reduced to 0.25% or lower.

The present application addresses the following. When a sample is analyzed with a microfluidic device, the reagent may be non-specifically adsorbed on the cover member. In conventional microfluidic devices, when detecting fluorescent signals in minute pores, fluorescence emitted from the non-specific adsorption of the reagent, which did not cause a problem in approaches other than digital measurement, may act as noise when counting the number of wells containing a fluorescent substance by digital measurement.

Although it is possible to prevent adsorption of the reagent to the cover member by using a material that is generally said to be hydrophobic, such as PDMS, for the cover member, this limits the materials that can be used.

In view of the above, the inventors found that it is possible to reduce the non-specific adsorption of the reagent on the cover member and improve detection efficiency without using a material that is generally said to be hydrophobic, and completed the present invention. An object of the present invention is to provide a microfluidic device capable of reducing non-specific adsorption of a reagent to a cover member and improving detection efficiency. Another object of the present invention is to provide a sample analysis method capable of correctly detecting signals generated from microwells by preventing fluorescence or the like generated by non-specific adsorption from causing noise when detecting the signals.

In order to achieve the above objects, the present invention includes the following aspects.

[1] A microfluidic device comprising: a microwell array having a plurality of microwells; and a cover member facing the microwell array with a gap therebetween, wherein a flow path is provided between the microwell array and the cover member, and a surface of the cover member facing the microwell array has an arithmetic average roughness Ra of 70 nm or less.

[2] The microfluidic device according to [1], wherein the surface of the cover member facing the microwell array has a water contact angle of 70 degrees or more, the water contact angle being defined as a contact angle of the surface to a water droplet on the surface.

[3] The microfluidic device according to [1] or [2], wherein the surface of the cover member facing the microwell array has a surface roughness Rz of 350 nm or less.

[4] The microfluidic device according to any one of [1] to [3], wherein an arithmetic average roughness Ra/a surface roughness Rz of the surface of the cover member facing the microwell array is 0.10 or more and 0.23 or less.

[5] The microfluidic device according to any one of [1] to [4], wherein a hydrophobic coating is applied to the surface of the cover member facing the microwell array.

[6] A sample analysis method using the microfluidic device according to any one of [1] to [5], comprising: supplying an aqueous solution containing a sample to the flow path; introducing a sealant into the flow path to replace the aqueous solution in the flow path and encapsulate the aqueous solution in the microwells; causing a reaction in the microwells to generate a signal for detection; and detecting the signal.

[7] The sample analysis method according to [6], wherein the sample is DNA, RNA, protein, lipid, a cell, or a bacterium.

The present application can provide a microfluidic device with reduced non-specific adsorption of a reagent. The present invention can also provide a sample analysis method capable of correctly detecting signals generated from microwells by preventing fluorescence or the like generated due to non-specific adsorption from causing noise when detecting the signals.

INDUSTRIAL APPLICABILITY

According to the present application, a microfluidic device and a sample analysis method capable of detecting fluorescence, phosphorescence, or the like of an aqueous solution in the wells as accurately as possible can be provided. For example, when making a diagnosis by detecting DNA, RNA, or the like derived from a living body, a reagent and a nucleic acid can be disposed in a minute space together.

REFERENCE SIGNS LIST

1 . . . Microfluidic device
10 . . . Substrate
20 . . . Cover member
30 . . . Microwell array
32 . . . Wall layer
33 . . . Microwell
100 . . . Aqueous solution
110 . . . Sealant Obviously, numerous modifications and variations of the present invention are possible in light of the above teachings. It is therefore to be understood that within the scope of the appended claims, the invention may be practiced otherwise than as specifically described herein.

What is claimed is:

1. A sample analysis method, comprising:

A) providing a microfluidic device, comprising:
  a substrate having a microwell array comprising a plurality of microwells;
  a peripheral member positioned on the substrate and configured to surround the microwell array of the substrate; and
  a cover member comprising a surface formed integrally with the peripheral member such that the surface of the cover member faces the microwell array of the substrate, the surface of the cover member having an arithmetic average roughness, Ra, of 35 nm or less, a surface roughness, Rz, of 350 nm or less, and an Ra/Rz ratio of from 0.10 to 0.24;
  wherein the cover member, the peripheral member, and the microwell array define a flow path configured to transport an aqueous sample to the plurality of microwells; and
  wherein the aqueous sample contacts the surface of the cover member;
B) introducing an aqueous sample comprising a target molecule and a detection reagent into the flow path of the microfluidic device;
C) filling the plurality of microwells with the aqueous sample;
D) reacting the target molecule with the detection reagent to generate a signal for detection; and
E) detecting the signal to thereby characterize the sample and
  wherein a signal originating from non-specific binding of the detection reagent to the surface of the cover member is either not detected or is detected from less than 10% of the detectable area of the surface of the cover member.

2. The sample analysis method of claim 1, wherein the detecting comprises determining with a false negative rate of less than 10% the number of the plurality of microwells having a detected signal.

3. The sample analysis method of claim 1, further comprising:
  introducing a sealant into the flow path such that the sealant replaces the aqueous sample in the flow path and encapsulates the aqueous sample in the plurality of microwells of the microwell array in the substrate.

4. The sample analysis method of claim 3, further comprising:

heating the microfluidic device to promote the reacting.

5. The sample analysis method of claim 1, wherein the target molecule is selected from a DNA, an RNA, a protein, or a lipid.

6. The sample analysis method of claim 1, wherein the aqueous sample comprises cells.

7. A sample analysis method, comprising:

A) providing a microfluidic device, comprising:

a substrate having a microwell array comprising a plurality of microwells;

a peripheral member positioned on the substrate and configured to surround the microwell array of the substrate; and a cover member, comprising a mirror-polished surface integrally molded to the peripheral member such that the surface of the cover member faces the microwell array of the substrate, the surface of the cover member having an arithmetic average roughness, Ra, of 35 nm or less, a surface roughness, Rz, of 350 nm or less, and an Ra/Rz ratio of from 0.10 to 0.24;

wherein the cover member, the peripheral member, and the microwell array define a flow path configured to transport an aqueous sample to the plurality of microwells, the flow path having a first end connected to an injection port and a second end connected to a discharge port, the ports positioned inside the peripheral member and along the longitudinal direction of the cover member:

wherein the aqueous sample contacts the surface of the cover member; and wherein the surface of the cover member is formed such that the surface of the cover member has a water contact angle of 85 degrees or more;

B) flushing the flow path of the microfluidic device with buffer;

C) introducing an aqueous sample comprising a target molecule and a detection reagent into the flow path such that the aqueous sample replaces the buffer in the flow path;

D) filling the plurality of microwells with the aqueous sample;

E) introducing a sealant into the flow path such that the sealant replaces the aqueous sample in the flow path and encapsulates the aqueous sample in the plurality of microwells of the microwell array in the substrate;

F) reacting the target molecule with the detection reagent to generate a signal for detection; and G) detecting the signal to thereby characterize the sample;

wherein a signal originating from non-specific binding of the detection reagent to the surface of the cover member is either not detected or is detected from less than 10% of the detectable area of the surface of the cover member.

8. The sample analysis method of claim 7, wherein the detecting comprises determining with a false negative rate of less than 10% the number of the plurality of microwells having a detected signal.

9. The sample analysis method of claim 7, further comprising:

heating the microfluidic device to promote the reacting.

* * * * *